(12) United States Patent
Huang

(10) Patent No.: US 8,757,564 B2
(45) Date of Patent: Jun. 24, 2014

(54) ANGLE-ADJUSTABLE MOUNTING APPARATUS

(76) Inventor: Ming-Hsien Huang, New Taipei (TW)

(*) Notice: Subject to any disclaimer, the term of this patent is extended or adjusted under 35 U.S.C. 154(b) by 0 days.

(21) Appl. No.: 13/561,850

(22) Filed: Jul. 30, 2012

(65) Prior Publication Data
US 2013/0240700 A1    Sep. 19, 2013

(30) Foreign Application Priority Data
Mar. 16, 2012 (TW) .............................. 101204856 U

(51) Int. Cl.
F16M 11/14 (2006.01)
F16M 13/00 (2006.01)
G03B 17/00 (2006.01)

(52) U.S. Cl.
USPC ............... 248/184.1; 248/183.1; 248/183.2; 248/636; 396/419; 396/428

(58) Field of Classification Search
CPC ....... F16M 11/10; F16M 11/04; F16M 13/02; F16M 11/24; A47B 21/0314
USPC ........... 248/371, 178.1, 179.1, 184.1, 183.4, 248/317, 323, 181.1, 181.2, 183.2, 176.3, 248/177.1, 122.1, 125.2, 125.7, 121, 187.1; 439/537, 140, 313; 396/419, 428
See application file for complete search history.

(56) References Cited

U.S. PATENT DOCUMENTS

| | | | | |
|---|---|---|---|---|
| 2,180,214 A * | 11/1939 | Rapp | ........................... | 248/181.1 |
| 2,318,633 A * | 5/1943 | Ries | ........................... | 248/183.2 |
| 2,500,048 A * | 3/1950 | Stoiber | ....................... | 248/184.1 |
| 3,128,982 A * | 4/1964 | Christopher | ................ | 248/183.2 |
| 4,225,105 A * | 9/1980 | Nakamura | ................. | 248/184.1 |
| 4,247,069 A * | 1/1981 | Kurz | ........................... | 248/183.2 |
| 4,249,817 A * | 2/1981 | Blau | ........................... | 396/428 |
| 4,763,151 A * | 8/1988 | Klinger | ........................ | 396/419 |
| 6,116,554 A * | 9/2000 | Wei | ............................. | 248/183.1 |
| 6,349,905 B1 * | 2/2002 | Mills | ........................... | 248/126 |
| 7,270,509 B2 * | 9/2007 | Disantis et al. | ............... | 411/332 |
| 7,303,171 B1 * | 12/2007 | Chen | .......................... | 248/184.1 |
| 7,828,256 B2 * | 11/2010 | Speggiorin | ................. | 248/187.1 |
| 8,267,361 B1 * | 9/2012 | Dordick | ..................... | 248/181.1 |
| 8,313,071 B2 * | 11/2012 | Huang | ....................... | 248/276.1 |
| 8,418,973 B2 * | 4/2013 | Liu et al. | .................... | 248/183.2 |
| 2002/0179786 A1 * | 12/2002 | Zheng | ........................ | 248/178.1 |
| 2003/0147641 A1 * | 8/2003 | Haney | ........................... | 396/419 |
| 2011/0297809 A1 * | 12/2011 | Bouissiere et al. | ........ | 248/274.1 |

* cited by examiner

*Primary Examiner* — Jonathan Liu
*Assistant Examiner* — Muhammad Ijaz
(74) *Attorney, Agent, or Firm* — Sheridan Ross P.C.

(57) ABSTRACT

An angle-adjustable mounting apparatus is for mounting a second object to a first object, and includes a first mounting device to be coupled to the first object, a second mounting device to be coupled to the second object and connected pivotally to the first mounting device, and a pivot-control unit. The pivot-control unit includes a plug component with a curved surface, a socket component which abuts against and is rotatable relative to the plug component to enable the second mounting device to pivot relative to the first mounting device, and an adjusting rod coupled to the socket component and operable to drive the socket component so that assembly of the socket component and the second mounting device pivots relative to the plug component.

19 Claims, 13 Drawing Sheets

ANGLE-ADJUSTABLE MOUNTING APPARATUS

CROSS REFERENCE TO RELATED APPLICATIONS

This application claims the benefit of Taiwan Application No. 101204856 filed Mar. 16, 2012, the entire disclosure of each of which is incorporated herein by reference.

BACKGROUND OF THE INVENTION

1. Field of the Invention

The present invention relates to an angle-adjustable mounting apparatus, more particularly to an angle-adjustable mounting apparatus which may be adjusted with precision and ease.

2. Description of the Related Art

Referring to FIG. 1 and FIG. 2, a conventional mounting apparatus 11 is adapted for mounting an electronic device 13 to a fixed object, such as a ceiling 12. The mounting apparatus 11 includes a first mounting device 111 which is to be fixed to the ceiling 12, a second mounting device 113 which is for mounting the electronic device 13 and which has two lateral wings disposed at two sides of the first mounting device 111, and two pins 112 which are respectively disposed through the two lateral wings of the second mounting device 113 and the two sides of the first mounting device 111. The second mounting device 113 is pivotable relative to the first mounting device 111 about the pins 112. The two lateral wings of the second mounting device 113 are respectively formed with two curved limiting slots 114 therethrough. The mounting apparatus 11 further includes two bolts 115 which extend through a corresponding one of the limiting slots 114 and which engage threadedly and respectively the two sides of the first mounting device 111. Each of the bolts 115 is operable to screw in and out.

When the bolts 115 are screwed to move toward the first mounting device 111 (i.e., screw-in), the bolts 115 force the second mounting device 113 to press tightly the first mounting device 111 so as to fasten the second mounting device 113 to the first mounting device 111. When the bolts 115 are screwed to move away from the first mounting device 111 (i.e., screw-out), the second mounting device 113 ceases to press tightly the first mounting device 111, such that assembly of the second mounting device 113 and the electronic device 13 may pivot relative to the first mounting device 111 within an angle limited by the curved limiting slots 114. After the assembly of the second mounting device 113 and the electronic device 13 is adjusted to a desired angle, the bolts 115 are screwed to force the second mounting device 113 to press the first mounting device 111, such that the second mounting device 113 is fastened to the first mounting device 111 once again. An effect of adjusting the angle of the electronic device 13 is thus achieved.

However, the conventional mounting apparatus 11 has the following drawbacks when adjusting the angle of the electronic device 13 relative to the ceiling 12. First, when the bolts 115 do not force the second mounting device 113 to press the first mounting device 111, an operator must support the weight of the electronic device 13 to adjust the angle thereof. Therefore, the process of adjusting the angle of the electronic device 13 is quite strenuous. Furthermore, after the electronic device 13 is adjusted to the desired angle, each of the bolts 115 must be screwed respectively for forcing the second mounting device 113 to press the first mounting device 111 so as to fasten the second mounting device 113 to the first mounting device 111. Since the supporting strength for the electronic device 13 is unstable during the process of screwing the bolts 115, the angle of the electronic device 13 after fastening the second mounting device 113 to the first mounting device 111 often deviates from the desired angle, such that the angle of the electronic device 13 may not be adjusted precisely.

SUMMARY OF THE INVENTION

Therefore, an object of the present invention is to provide an angle-adjustable mounting apparatus which may be adjusted with precision and ease.

The angle-adjustable mounting apparatus of the present invention is for mounting a second object to a first object. The angle-adjustable mounting apparatus comprises a first mounting device to be coupled to the first object, a second mounting device to be coupled to the second object, and a first pivot-control unit. The second mounting device is connected pivotally to the first mounting device and is pivotable relative to the first mounting device about a first axis. The first pivot-control unit includes a first component provided at the first mounting device and a second component provided at the second mounting device. The second component abuts against and is rotatable relative to the first component to enable the second mounting device to pivot relative to the first mounting device about the first axis. One of the first and second components is a plug component with a curved surface, and the other one of the first and second components is a socket component. The first pivot-control unit further includes a first adjusting rod coupled to the second component and operable to drive the second component so that assembly of the second component and the second mounting device pivots relative to the first component.

Preferably, the second component is formed with a first threaded hole therethrough. The first threaded hole has a hole axis that is not parallel to the first axis. The first adjusting rod is a threaded rod which is coupled rotatably to the second mounting device for rotation about a rod axis of the first adjusting rod and which threadedly engages the first threaded hole. Rotation of the first adjusting rod relative to the second mounting device results in displacement of the first adjusting rod along the first threaded hole and pivoting of the assembly of the second component and the second mounting device relative to the first component.

Preferably, the socket component receives rotatably the plug component and has an inner socket wall surface that abuts against the curved surface of the socket component.

Preferably, the first mounting device includes a first mounting part, a second mounting part, and a second pivot-control unit. The first mounting part is to be coupled to the first object. The second mounting part is connected pivotally to the first mounting part and is pivotable relative to the first mounting part about a second axis that is perpendicular to the first axis. The second mounting device is connected pivotally to the second mounting part. The second pivot-control unit includes a third component provided at the first mounting part and a fourth component provided at the second mounting part. The fourth component abuts against and is rotatable relative to the third component to enable the second mounting part to pivot relative to the first mounting part about the second axis. The second pivot-control unit further includes a second adjusting rod coupled to the third component and operable to drive the third component so that assembly of the fourth component and the second mounting part pivots relative to the third component.

Preferably, the third component is formed with a second threaded hole therethrough. The second threaded hole has a hole axis that is not parallel to the second axis. The second adjusting rod is a threaded rod which is coupled rotatably to the first mounting part for rotation about a rod axis of the second adjusting rod and which threadedly engages the second threaded hole. Rotation of the second adjusting rod relative to the first mounting part results in displacement of the third component along the second adjusting rod and pivoting of the assembly of the fourth component and the second mounting part relative to the third component.

Preferably, one of the third and fourth components is a plug component with a curved surface, and the other one of the third and fourth components is a socket component that receives rotatably the plug component and that has an inner socket wall surface that abuts against the curved surface.

Preferably, the second mounting device includes a first connection part, a second connection part, and a third pivot-control unit. The first connection part is connected pivotally to the second mounting part. The second connection part is to be connected to the second object and is retained pivotally on the first connection part so as to be pivotable relative to the first connection part about a third axis perpendicular to the first and second axes. The third pivot-control unit includes an adjusting base and a third adjusting rod. The adjusting base is provided on the second connection part and is formed with a third threaded hole therethrough. The third threaded hole has a hole axis that is not parallel to the third axis. The third adjusting rod is a threaded rod coupled rotatably to the first connection part for rotation about a rod axis of the third adjusting rod. The third adjusting rod threadedly engages the third threaded hole. Rotation of the third adjusting rod relative to the first connection part results in displacement of the adjusting base along the third adjusting rod and pivoting of the second connection part relative to the first connection part.

Effects of the present invention reside in that the first and second mounting devices are to be coupled respectively to the first and second objects, and the second mounting device is connected pivotally to the first mounting device, such that by means of cooperative designs, such as pivotal connection between the first and second mounting devices, rotation of the first adjusting rod, and linear displacement between the second component and the first adjusting rod, an angle between the first and second objects may be adjusted with precision and ease.

BRIEF DESCRIPTION OF THE DRAWINGS

Other features and advantages of the present invention will become apparent in the following detailed description of the two embodiments with reference to the accompanying drawings, of which.

DETAILED DESCRIPTION OF THE EMBODIMENTS

Figure 1:
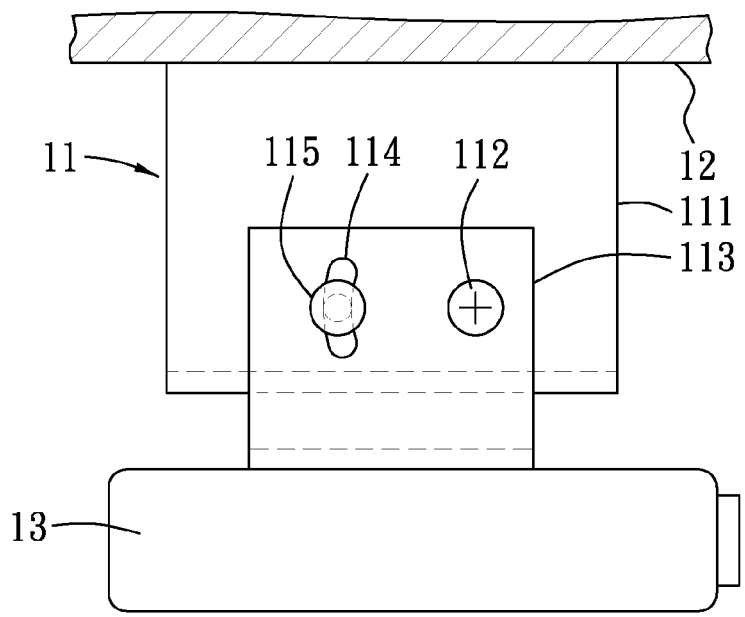
FIG. 1 is a schematic side view of a conventional mounting apparatus.
Figure 2:
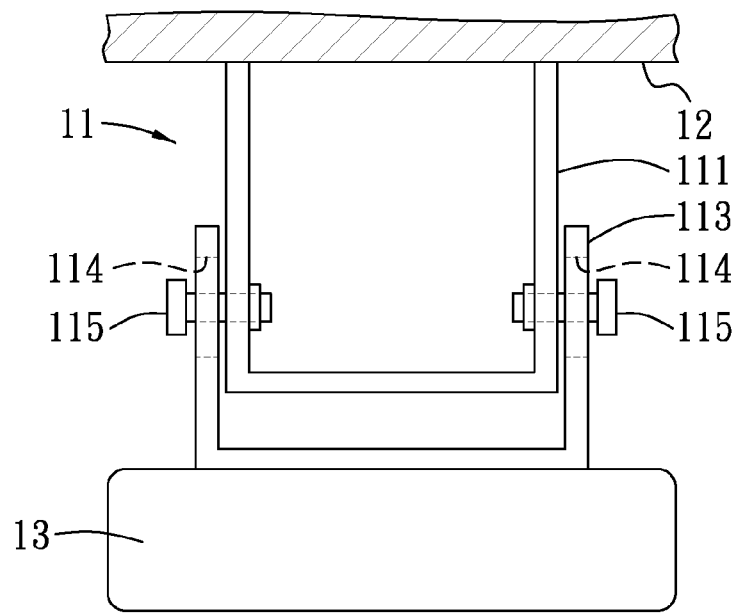
FIG. 2 is a schematic bottom view of the conventional mounting apparatus.

Before the present invention is described in greater detail with reference to the embodiments, it should be noted that the same reference numerals are used to denote the same elements throughout the following description.

Figure 3:
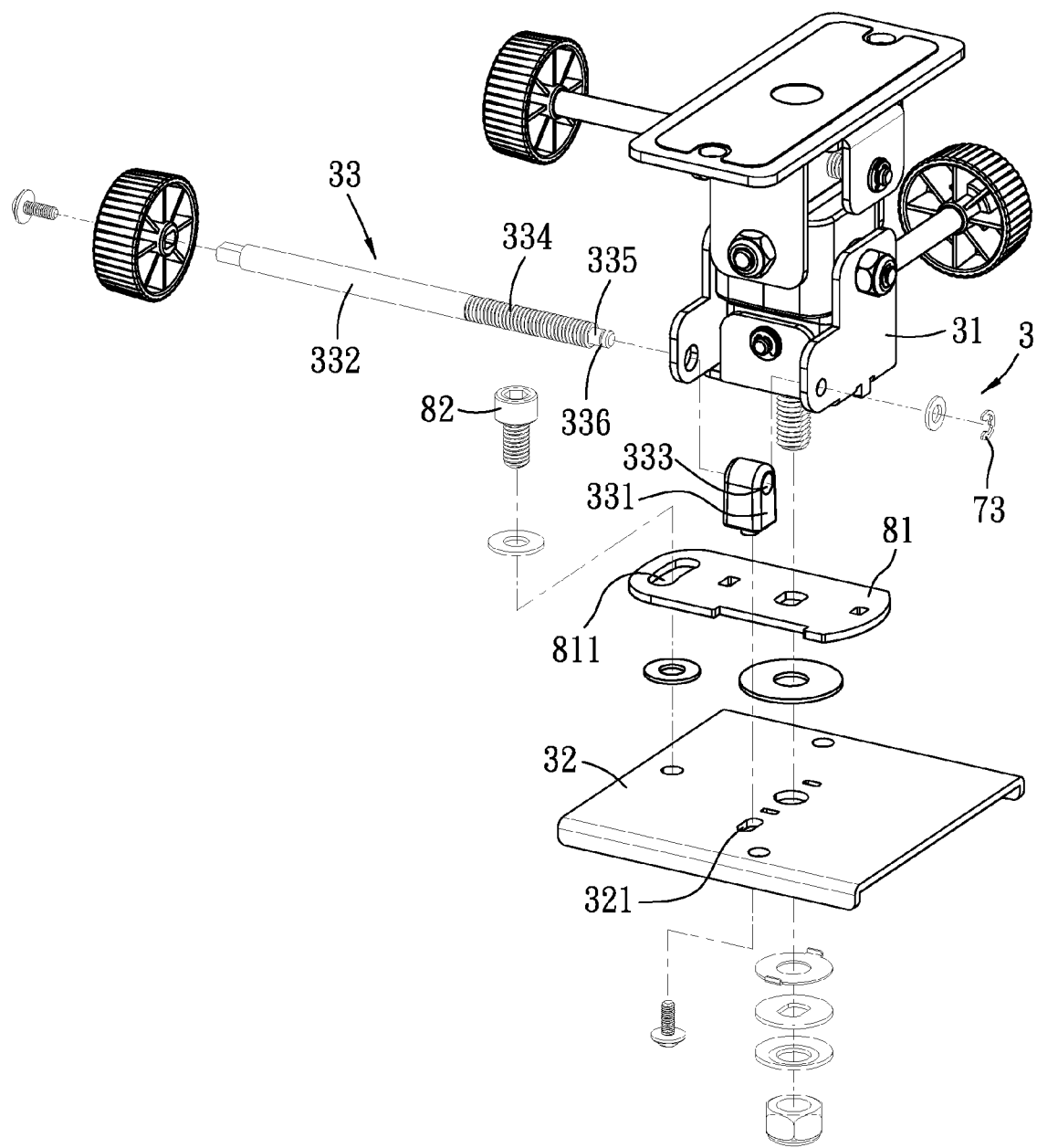
FIG. 3 is an exploded perspective view illustrating components of a first preferred embodiment of an angle-adjustable mounting apparatus of the present invention.
Figure 4:
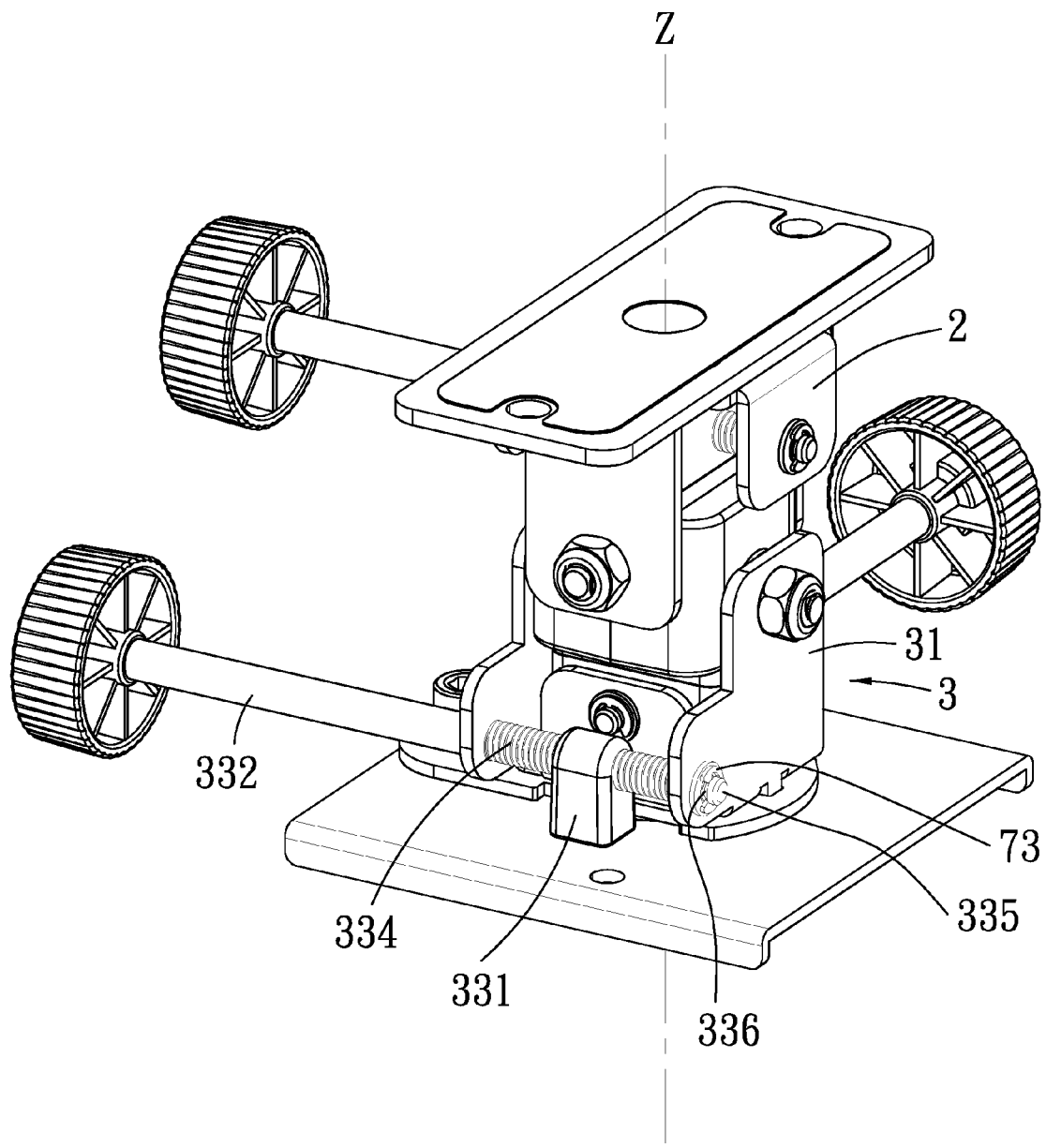
FIG. 4 is a perspective view of the first preferred embodiment.

Referring to FIG. 3 and FIG. 4, a first preferred embodiment of an angle-adjustable mounting apparatus according to the present invention is for mounting a second object, such as a base of a projector (not shown), to a first object, such as a telescopic rod fixed to a wall (not shown). Components of the angle-adjustable mounting apparatus are pivotable about a first axis (X), a second axis (Y) and a third axis (Z) which are perpendicular to each other such that a relative position of the second object with respect to the first object may be adjusted in three directions.

Pivoting of the components of the angle-adjustable mounting apparatus about the first axis (X) is illustrated hereinafter.

Figure 5:
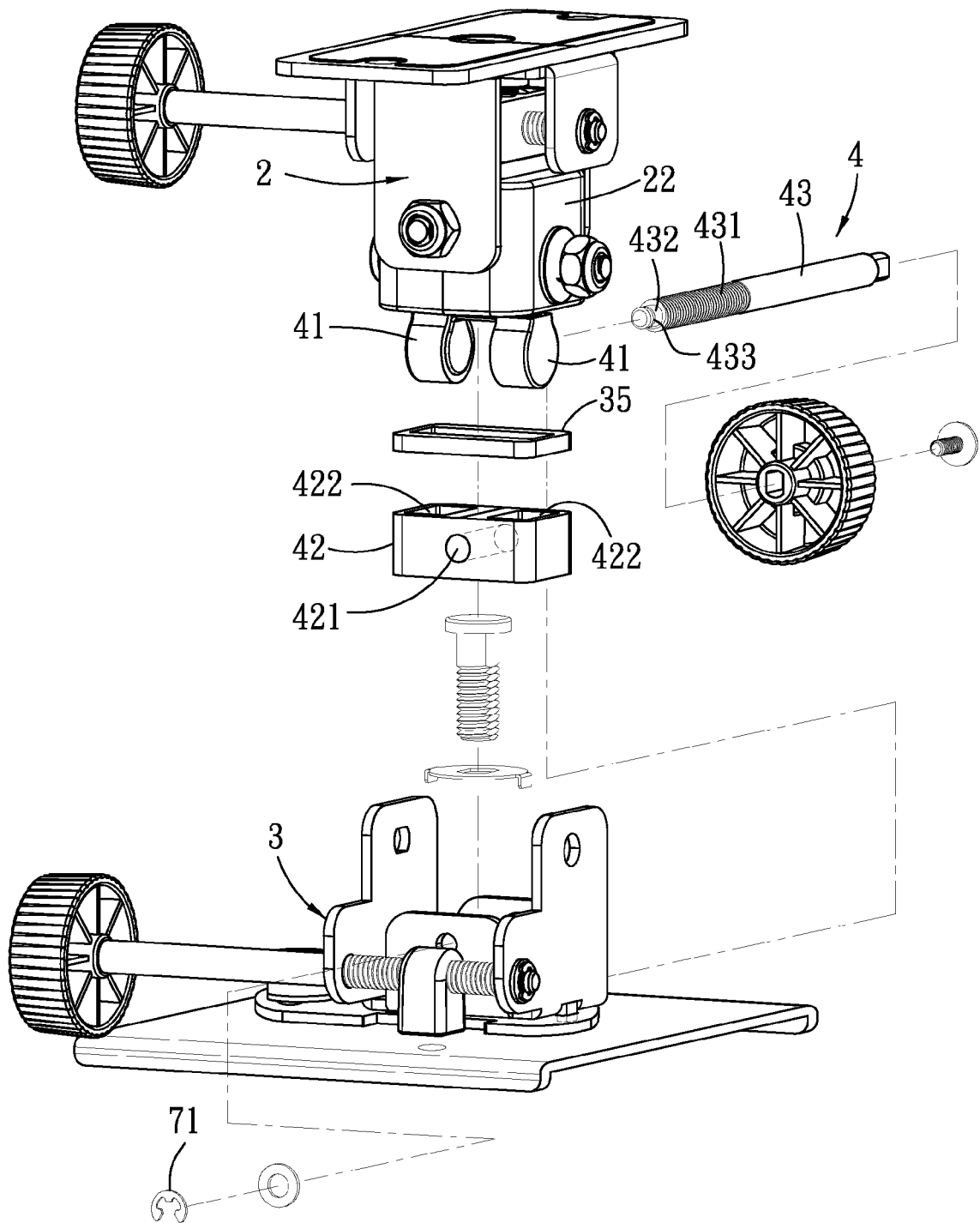
FIG. 5 is a partly exploded perspective view illustrating a first mounting device, a second mounting device, and a first pivot-control unit of the first preferred embodiment.
Figure 6:
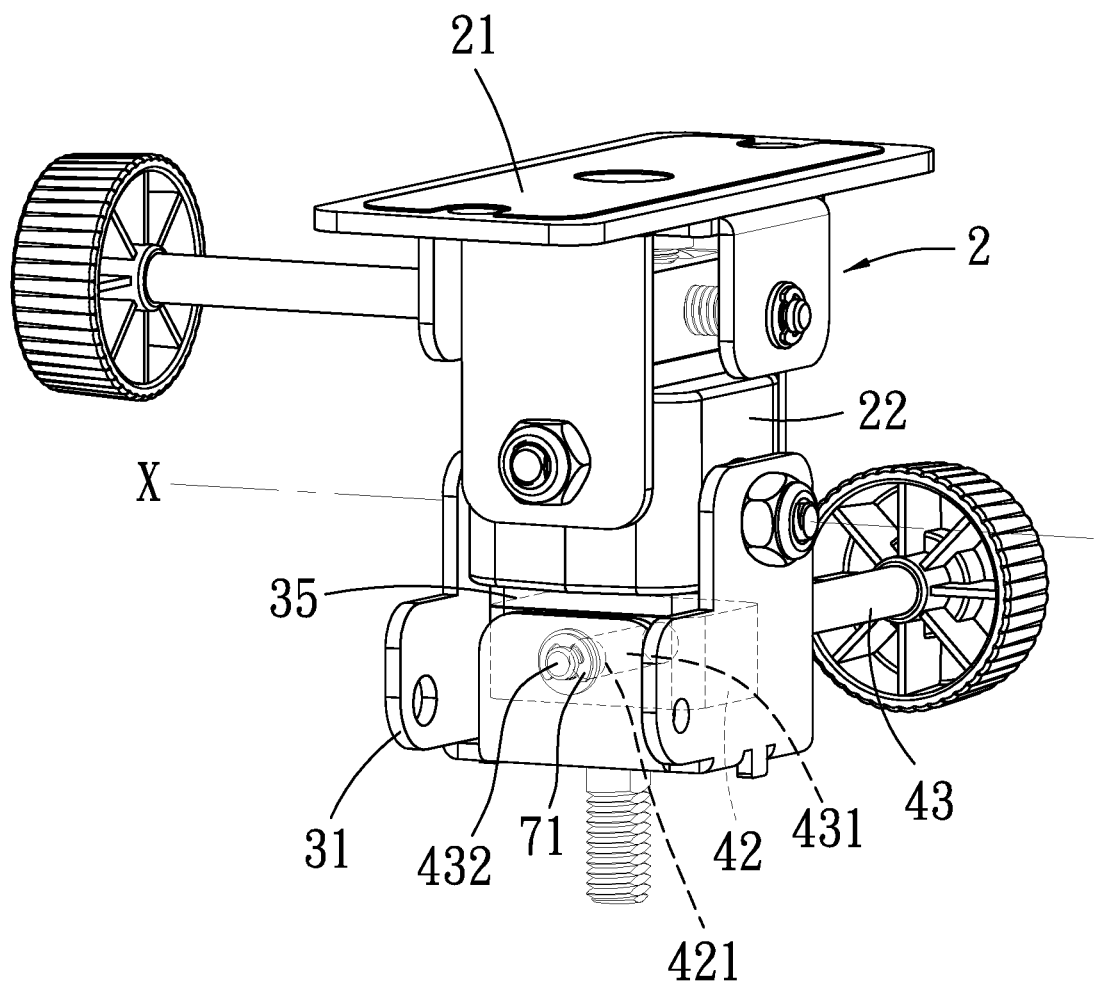
FIG. 6 is a fragmentary perspective view illustrating assembly of the first mounting device, the second mounting device, and the first pivot-control unit of the first preferred embodiment.

Referring to FIGS. 4, 5 and 6, the first preferred embodiment of the angle-adjustable mounting apparatus comprises a first mounting device 2, a second mounting device 3, and a first pivot mounting unit 4. The first mounting device 2 is to be coupled to the first object. The second mounting device 3 is to be coupled to the second object. The second mounting device 3 is connected pivotally to the first mounting device 2 and is pivotable relative to the first mounting device 2 about a first axis (X). The first pivot-control unit 4 includes a first component 41 provided at the first mounting device 2 and a second component 42 provided at the second mounting device 3. The second component 42 abuts against and is rotatable relative to the first component 41 to enable the second mounting device 2 to pivot relative to the first mounting device 3 about the first axis (X). The first pivot-control unit 4 further includes a first adjusting rod 43 coupled to the second component 42 and operable to drive the second component 42 so that assembly of the second component 42 and the second mounting device 3 pivots relative to the first component 41.

The second component 42 is formed with a first threaded hole 421 therethrough. The first threaded hole 421 has a hole axis that is not parallel to the first axis (X). In this embodiment, the hole axis is perpendicular to the first axis (X). However, an extension direction of the hole axis of the first threaded hole 421 is not limited herein, as long as the hole axis of the first threaded hole 421 is not parallel to the first axis (X). The first adjusting rod 43 is a threaded rod which is coupled rotatably to the second mounting device 3 for rotation about a rod axis of the first adjusting rod 43 and which threadedly engages the first threaded hole 421. Rotation of the first adjusting rod 43 relative to the second mounting device 3 results in displacement of the first adjusting rod 43 along the first threaded hole 421 and pivoting of the assembly of the second component 42 and the second mounting device 3 relative to the first component 2.

The first component 41 is provided with two plug components with curved surfaces, and is formed on one side of the first mounting device 2 adjacent to the second mounting device 3. However, the number of the plug components of the first component 41 is not limited herein, and may be one, three, or more than three. More specifically, the plug components are substantially cylindrical in shape. However, the shapes of the plug components are not limited herein, and may be spherical or other shapes. The second component 42 is provided with two socket components 422 that are formed perpendicularly through the second component 42, that receive rotatably the plug components, and that have inner socket wall surfaces that abut against the curved surfaces of the plug components. However, formation of the socket components 422 is not limited to penetration through the second component 42, and the socket components 422 are merely required to be formed in one side of the second component 42 proximate to the first mounting device 2 and to receive rotatably the plug components. Furthermore, the number of the socket components 422 of the second component 42 is not limited to two, and may correspond to the number of the plug components of the first component 41 to be one, three, or more than three.

The first adjusting rod 43 has a first large-diameter section 431, a first small-diameter section 432 which is located at a distal end of the first large-diameter section 431 and which has a diameter smaller than that of the first large-diameter section 431, and a first annular slot 433 formed in the first small-diameter section 432. The first small-diameter section 432 of the first adjusting rod 43 extends through one part of the second mounting device 3. A hole diameter of said one part of the second mounting device 3 through which the first small-diameter section 432 extends is larger than a diameter of the first small-diameter section 432 and is smaller than that of the first large-diameter section 431. The angle-adjustable mounting apparatus further comprises an E-shaped first engaging ring 71 for engaging the first annular slot 433 in a manner that a section of said one part of the second mounting device 3 is sandwiched between the first large-diameter section 431 and the first engaging ring 71. Therefore, the first adjusting rod 43 may not displace relative to the second mounting device 3 when operated to rotate.

Figure 9:
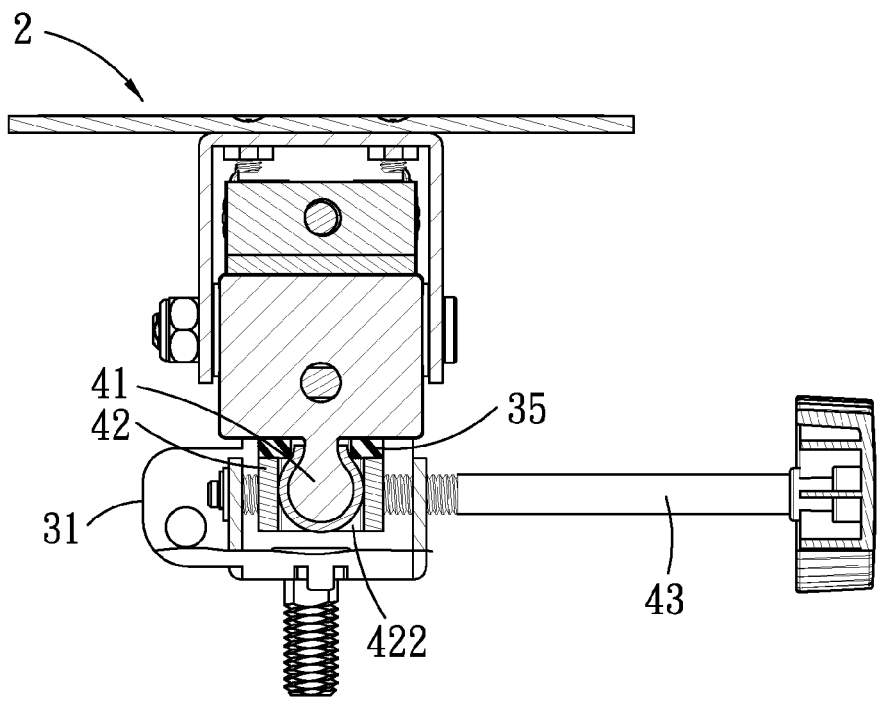
FIG. 9 is a fragmentary schematic sectional view illustrating a state of the first preferred embodiment prior to rotation of the first adjusting rod.
Figure 10:
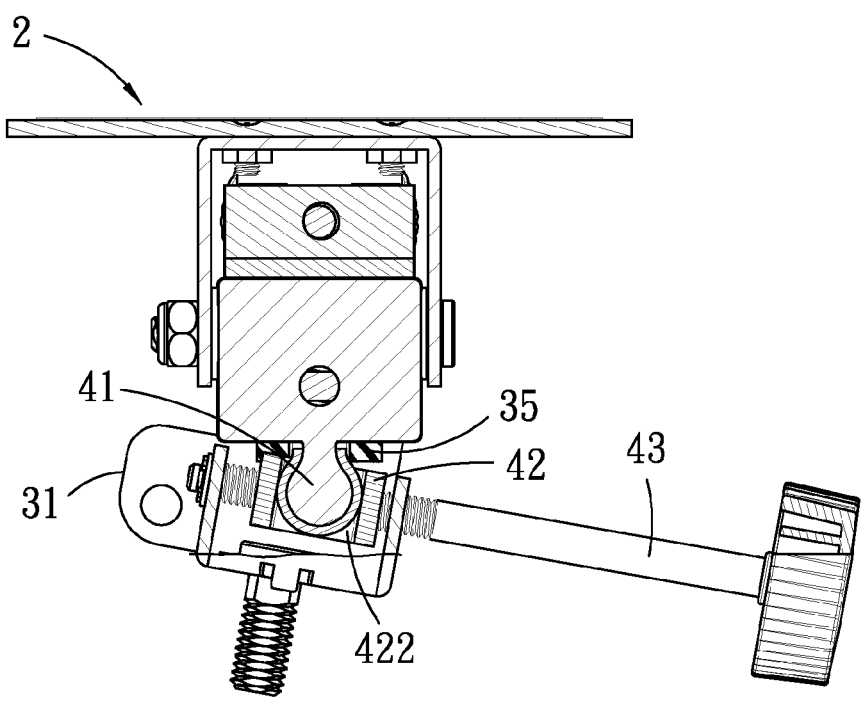
FIG. 10 is a fragmentary schematic sectional view similar to FIG. 9 illustrating that rotation of the first adjusting rod results in pivoting of assembly of the second component and the second mounting device relative to the first component.

Referring to FIGS. 6, 9 and 10, rotation of the first adjusting rod 43 relative to the second mounting device 3 results in displacement of the first adjusting rod 43 along the first threaded hole 421 of the second component 42. Since the first adjusting rod 43 may not displace relative to the second mounting device 3, the second mounting device 3 is displaced relative to the first component 41. At this moment, since the second mounting device 3 is connected pivotally to the first mounting device 2 and is pivotable relative to the first mounting device 2 about the first axis (X), the second component 42 abuts against and rotates relative to the first component 41 to enable the assembly of the second component 42 and the second mounting device 3 to pivot relative to the first mounting device 2 about the first axis (X). As a result, the second mounting device 3 brings the second object coupled thereto to pivot relative to the first object. It is noted that the second component 42 rotates relative to the first component 41 as a result of the hole axis of the first threaded hole 421 being maintained parallel to the rod axis of the first adjusting rod 43. During a process of the second component 42 pivoting relative to the first component 41, the second component 42 may pivot smoothly and not rotate idly as a result of the inner socket wall surfaces of the socket components 422 abutting against the curved surfaces of the plug components. In this embodiment, preferably, the inner socket wall surface of each of the socket components 422 abuts against diametrically opposite parts of the curved surface of a respective one of the plug components, such that the second component 42 may not rotate idly as the first adjusting rod 34 is operated in an opposite direction. However, a contact relation between the inner socket wall surfaces and the curved surfaces is not limited to the disclosure herein.

Pivoting of the components of the angle-adjustable mounting apparatus about the first axis (Y) is illustrated hereinafter.

Figure 7:
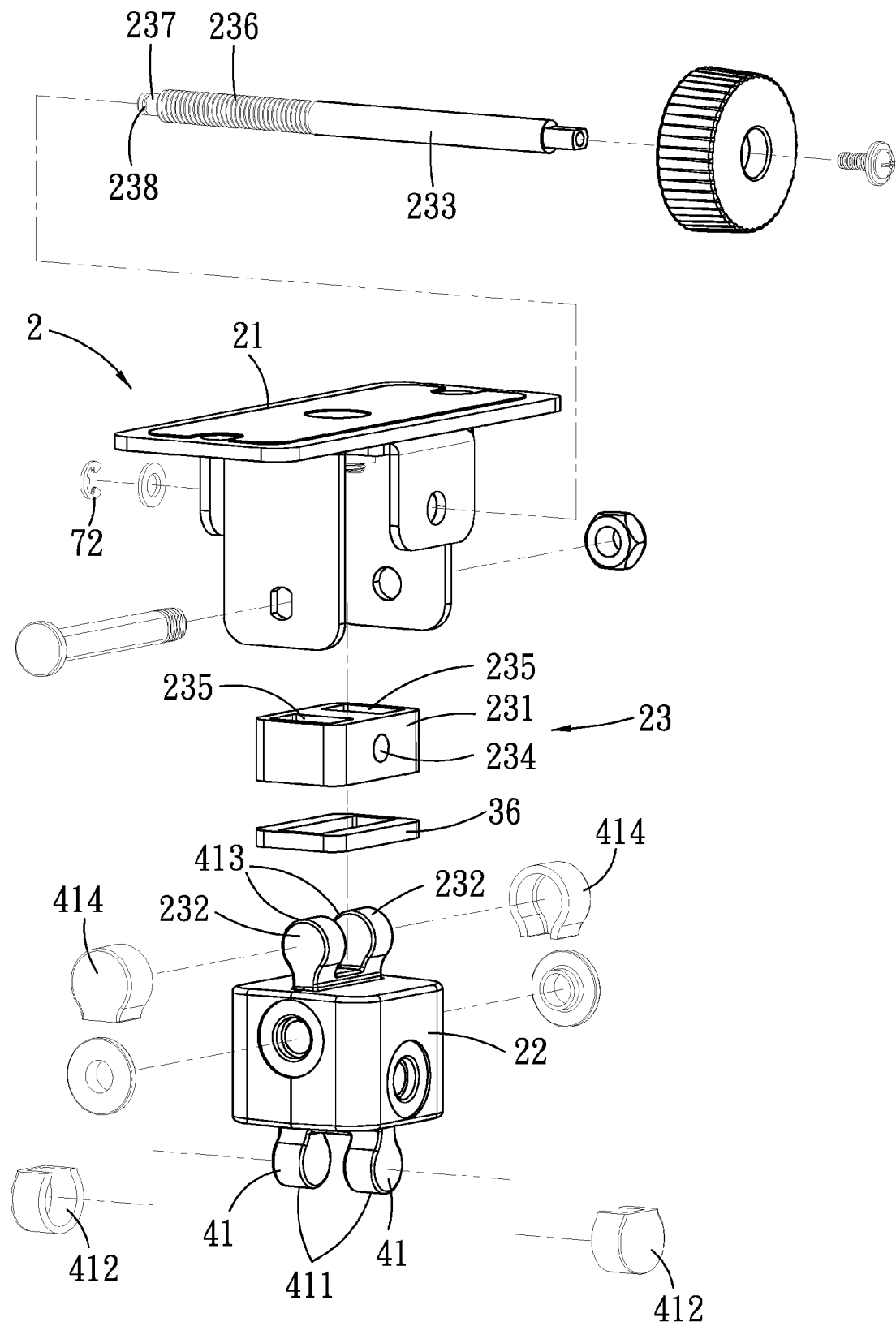
FIG. 7 is a fragmentary exploded perspective view illustrating a first mounting part, a second mounting part, and a second pivot-control unit of the first preferred embodiment.
Figure 8:
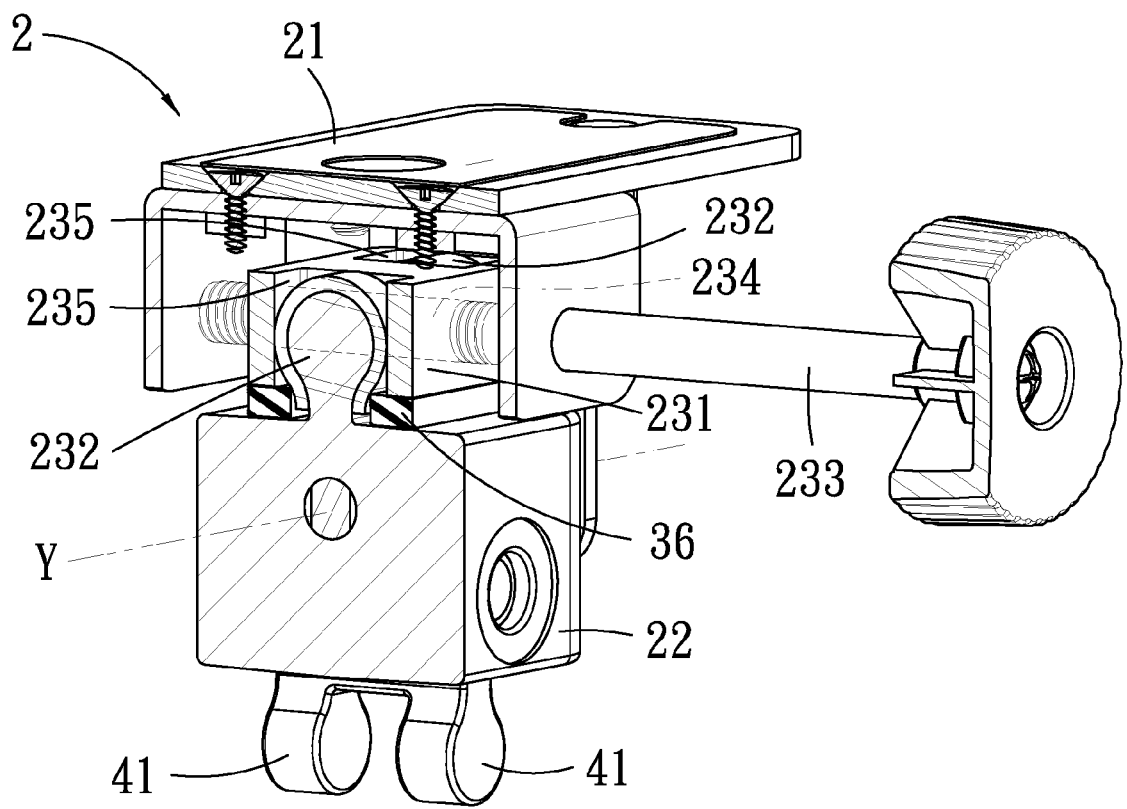
FIG. 8 is a fragmentary perspective cutaway view illustrating the first preferred embodiment.

Referring to FIGS. 6, 7 and 8, the first mounting device 2 includes a first mounting part 21, a second mounting part 22, and a second pivot-control unit 23. The first mounting part 21 is to be coupled to the first object. The second mounting part 22 is disposed between the first mounting part 21 and the second mounting device 3, is connected pivotally to the first mounting part 21 and is pivotable relative to the first mounting part 21 about a second axis (Y) that is perpendicular to the first axis (X). The second mounting device 3 is connected pivotally to the second mounting part 22. The second pivot-control unit 23 includes a third component 231 provided at the first mounting part 21 and a fourth component 232 provided at the second mounting part 22. The fourth component 232 abuts against and is rotatable relative to the third component 231 to enable the second mounting part 22 to pivot relative to the first mounting part 21 about the second axis (Y). The second pivot-control unit 23 further includes a second adjusting rod 233 coupled to the third component 231 and operable to drive the third component 231 so that assembly of the fourth component 232 and the second mounting part 22 pivots relative to the third component 231.

The third component 231 is formed with a second threaded hole 234 therethrough. The second threaded hole 234 has a hole axis that is not parallel to the second axis (Y). In this embodiment, the hole axis of the second threaded hole 234 is perpendicular to the second axis (Y). However, an extension direction of the hole axis of the second threaded hole 234 is not limited herein, as long as the hole axis of the second threaded hole 234 is not parallel to the second axis (Y). The second adjusting rod 233 is a threaded rod which is coupled rotatably to the first mounting part 21 for rotation about a rod axis of the second adjusting rod 233 and which threadedly engages the second threaded hole 234. Rotation of the second adjusting rod 233 relative to the first mounting part 21 results in displacement of the third component 231 along the second adjusting rod 233 and pivoting of the assembly of the fourth component 232 and the second mounting part 22 relative to the third component 231.

The fourth component 232 is provided with two plug components with curved surfaces, and is formed on one side of the second mounting part 22 adjacent to the first mounting part 21. However, the number of the plug components of the fourth component 232 is not limited herein, and may be one, three, or more than three. More specifically, the plug components are substantially cylindrical in shape. However, the shapes of the plug components are not limited herein, and may be spherical or other shapes. The third component 231 is provided with two socket components 235 that are formed perpendicularly through the third component 231, that receive rotatably the plug components of the fourth component 232, and that have inner socket wall surfaces that abut against the curved surfaces of the plug components. However, formation of the socket components 235 is not limited to penetration through the third component 231, and the socket components 235 are merely required to be formed in one side of the third component 231 proximate to the second mounting part 22 and to receive rotatably the plug components of the fourth component 232. Furthermore, the number of the socket components 235 of the third component 231 is not limited to two, and may correspond to the number of the plug components of the fourth component 232 to be one, three, or more than three.

The second adjusting rod 233 has a second large-diameter section 236, a second small-diameter section 237 which is located at a distal end of the second large-diameter section 236 and which has a diameter smaller than that of the second large-diameter section 236, and a second annular slot 238 formed in the second small-diameter section 237. The second small-diameter section 237 of the second adjusting rod 233 extends through the first mounting part 21. A hole diameter of the first mounting part 21 through which the second small-diameter section 237 extends is larger than a diameter of the second small-diameter section 237 and is smaller than that of the second large-diameter section 236. The angle-adjustable mounting apparatus further comprises an E-shaped second engaging ring 72 for engaging the second annular slot 238 in a manner that a section of the first mounting part 21 is sandwiched between the second large-diameter section 236 and the second engaging ring 72. Therefore, the second adjusting rod 233 may not displace relative to the first mounting part 21 when operated to rotate.

Figure 11:
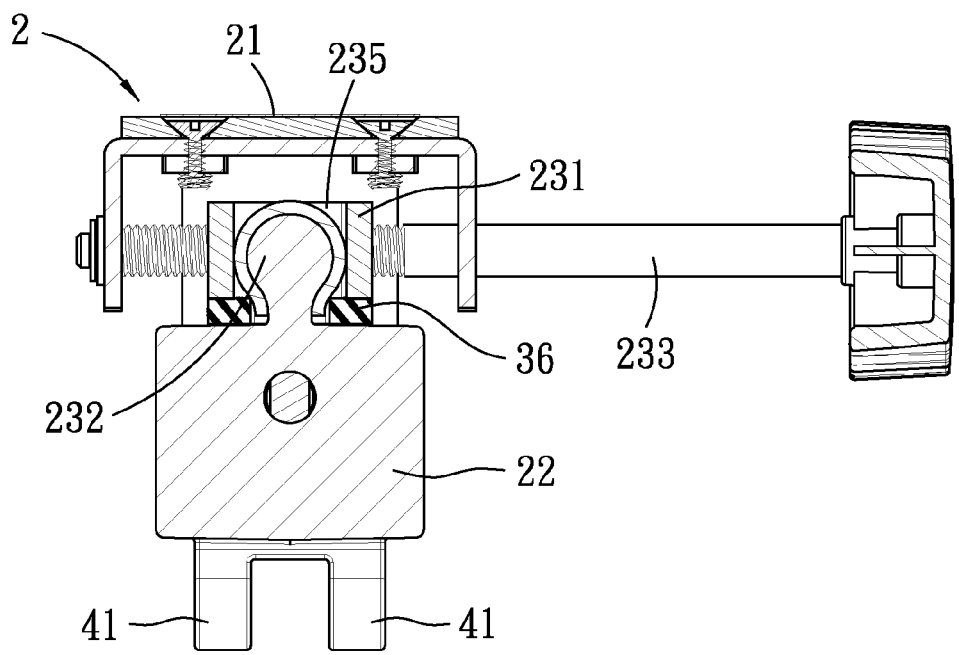
FIG. 11 is a fragmentary schematic rear sectional view illustrating a state of the first mounting device prior to rotation of a second adjusting rod.
Figure 12:
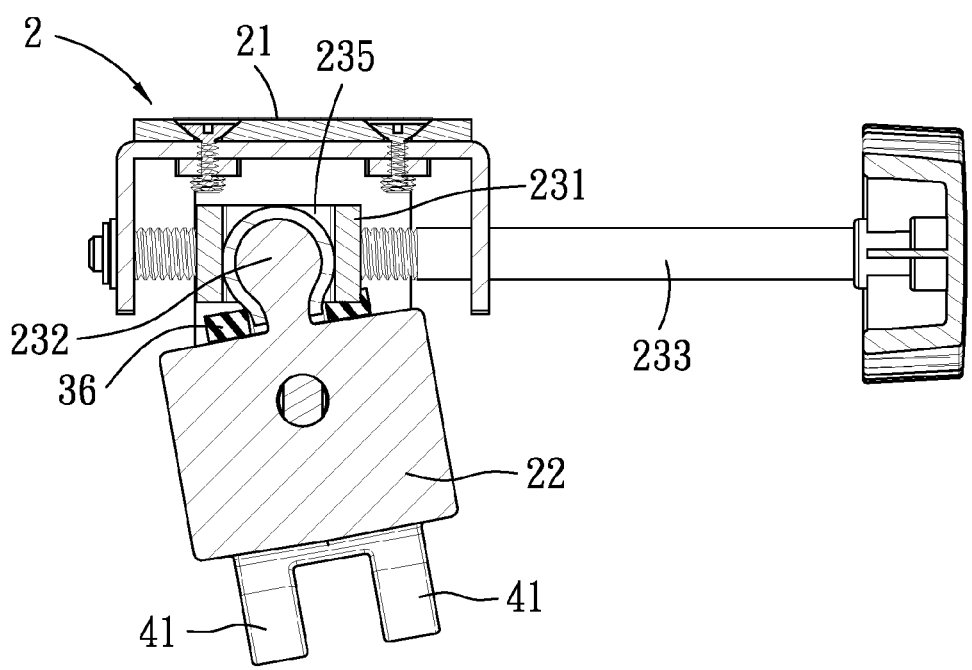
FIG. 12 is a fragmentary schematic rear sectional view similar to FIG. 11 illustrating that rotation of the second adjusting rod results in pivoting of the assembly of a fourth component and the second mounting part relative to a third component.

Referring to FIGS. 8, 11 and 12, rotation of the second adjusting rod 233 relative to the first mounting device 21 results in displacement of the third component 231 along the second adjusting rod 233. Since the socket components 235 of the third component 231 receive rotatably the plug components of the fourth component 232, the socket components 235 of the third component 231 push against the plug components of the fourth component 232 which is formed on said one side of the second mounting part 22 adjacent to the first mounting part 21. At this moment, since the second mounting part 22 is connected pivotally to the first mounting part 21 and is pivotable relative to the first mounting part 21 about the second axis (Y), the fourth component 232 abuts against and rotates relative to the third component 231 to enable the assembly of the fourth component 232 and the second mounting part 22 to pivot relative to the first mounting part 21 about the second axis (Y). As a result, the second mounting part 22, by means of the second mounting device 3 being connected pivotally to the second mounting part 22, brings the second object coupled to the second mounting device 3 to pivot relative to the first object. During a process of the assembly of the fourth component 232 and the second mounting part 22 being brought by the third component 231 to pivot about the second axis (Y), the fourth component 232 may pivot smoothly and not rotate idly as a result of the inner socket wall surfaces of the socket components 235 of the third component 231 abutting against the curved surfaces of the plug components of the fourth component 232. In this embodiment, preferably, the inner socket wall surface of each of the socket components 235 abuts against diametrically opposite parts of the curved surface of a respective one of the plug components of the fourth component 232, such that the fourth component 232 may not rotate idly as the second adjusting rod 233 is operated in an opposite direction. However, a contact relation between the inner socket wall surfaces of the socket components 235 and the curved surfaces of the plug components of the fourth component 232 is not limited to the disclosure herein.

Pivoting of the components of the angle-adjustable mounting apparatus about the third axis (Z) is illustrated hereinafter.

Referring to FIGS. 3 and 4, the second mounting device 3 includes a first connection part 31, a second connection part 32, and a third pivot-control unit 33. The first connection part 31 is connected pivotally to the second mounting part 22 of the first mounting device 2. The aforementioned one part of the second mounting device 3 through which the first small-diameter section 432 of the first adjusting rod 43 extends is the first connection part 31 of the second mounting device 3. The second connection part 32 is to be connected to the second object and is retained pivotally on the first connection part 31 so as to be pivotable relative to the first connection part 31 about the third axis (Z) which is perpendicular to the first and second axes (X and Y) and which passes through the first connection part 31. The third pivot-control unit 33 includes an adjusting base 331 and a third adjusting rod 332. The adjusting base 331 is provided rotatably on the second connection part 32 and is formed with a third threaded hole 333 therethrough. The third threaded hole 333 has a hole axis that is not parallel to the third axis (Z). In this embodiment, the hole axis of the third threaded hole 333 is perpendicular to the third axis (Z) and is parallel to a surface of the second connection part 32. However, an extension direction of the hole axis of the third threaded hole 333 is not limited herein, as long as the hole axis is not parallel to the third axis (Z). The third adjusting rod 332 is a threaded rod coupled rotatably to the first connection part 31 for rotation about a rod axis of the third adjusting rod 332. The third adjusting rod 332 threadedly engages the third threaded hole 333 of the adjusting base 331. Rotation of the third adjusting rod 332 relative to the first connection part 31 results in displacement of the adjusting base 331 along the third adjusting rod 332 and pivoting of the second connection part 32 relative to the first connection part 31.

The second connection part 32 is movable relative to the adjusting base 331 on a plane perpendicular to the third axis (Z). In this embodiment, the second connection part 32 is formed with a longitudinal slot 321. The adjusting base 331 is provided rotatably on the second connection part 32 in a manner of extending through the longitudinal slot 321, and the second connection part 32 is movable relative to the adjusting base 331 along the longitudinal slot 321.

The third adjusting rod 332 has a third large-diameter section 334, a third small-diameter section 335 which is located at a distal end of the third large-diameter section 334 and which has a diameter smaller than that of the third large-diameter section 334, and a third annular slot 336 formed in the third small-diameter section 335. The third small-diameter section 335 of the third adjusting rod 332 extends through the first connection part 31. A hole diameter of the first connection part 31 through which the third small-diameter section 335 extends is larger than a diameter of the third small-diameter section 335 and is smaller than that of the third large-diameter section 334. The angle-adjustable mounting apparatus further comprises an E-shaped third engaging ring 73 for engaging the third annular slot 336 in a manner that a section of the first connection part 31 is sandwiched between the third large-diameter section 334 and the third engaging ring 73. Therefore, the third adjusting rod 332 may not displace relative to the first connection part 31 when operated to rotate.

Figure 13:
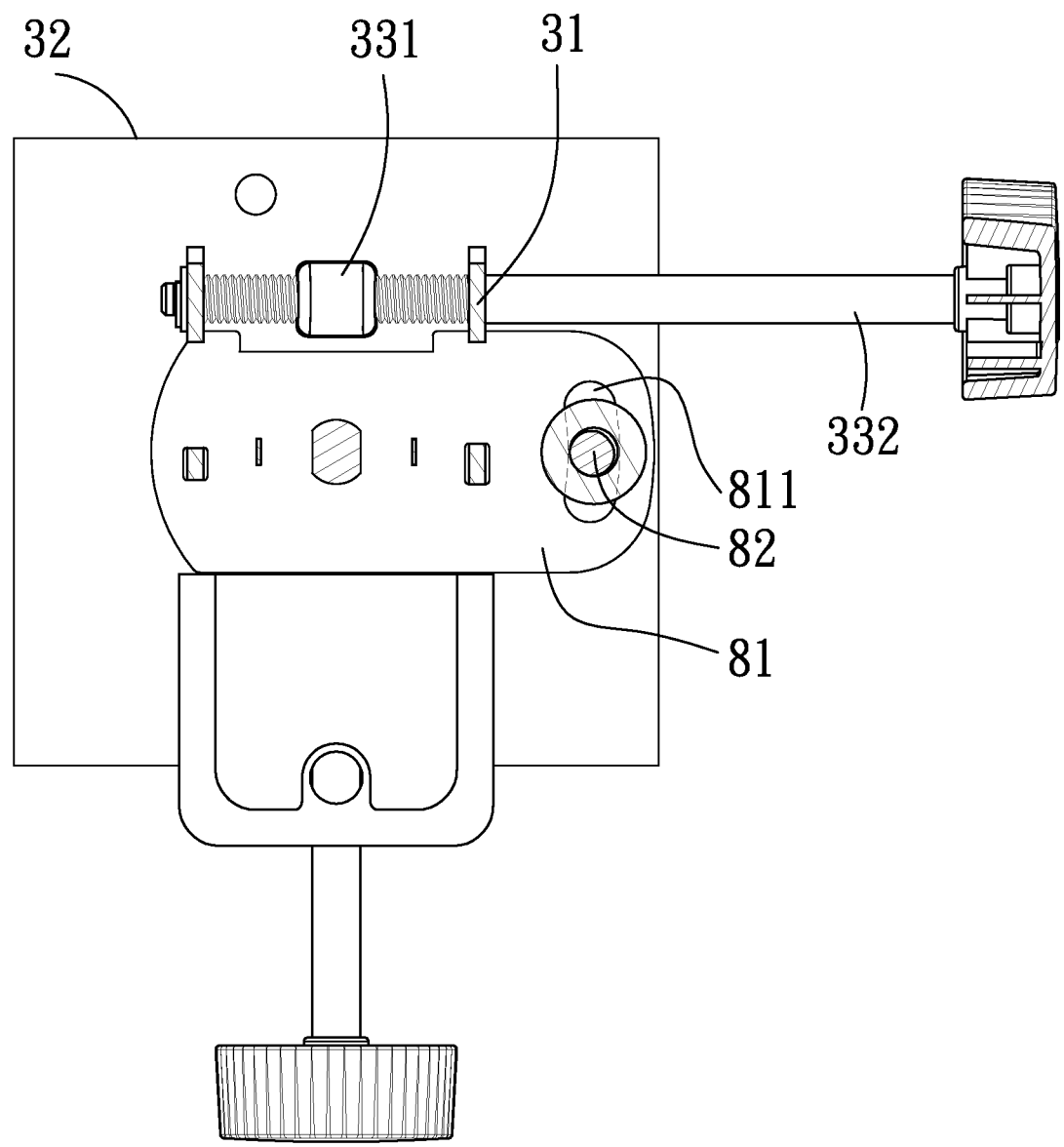
FIG. 13 is a fragmentary schematic top sectional view illustrating a state of the second mounting device prior to rotation of a third adjusting rod.
Figure 14:
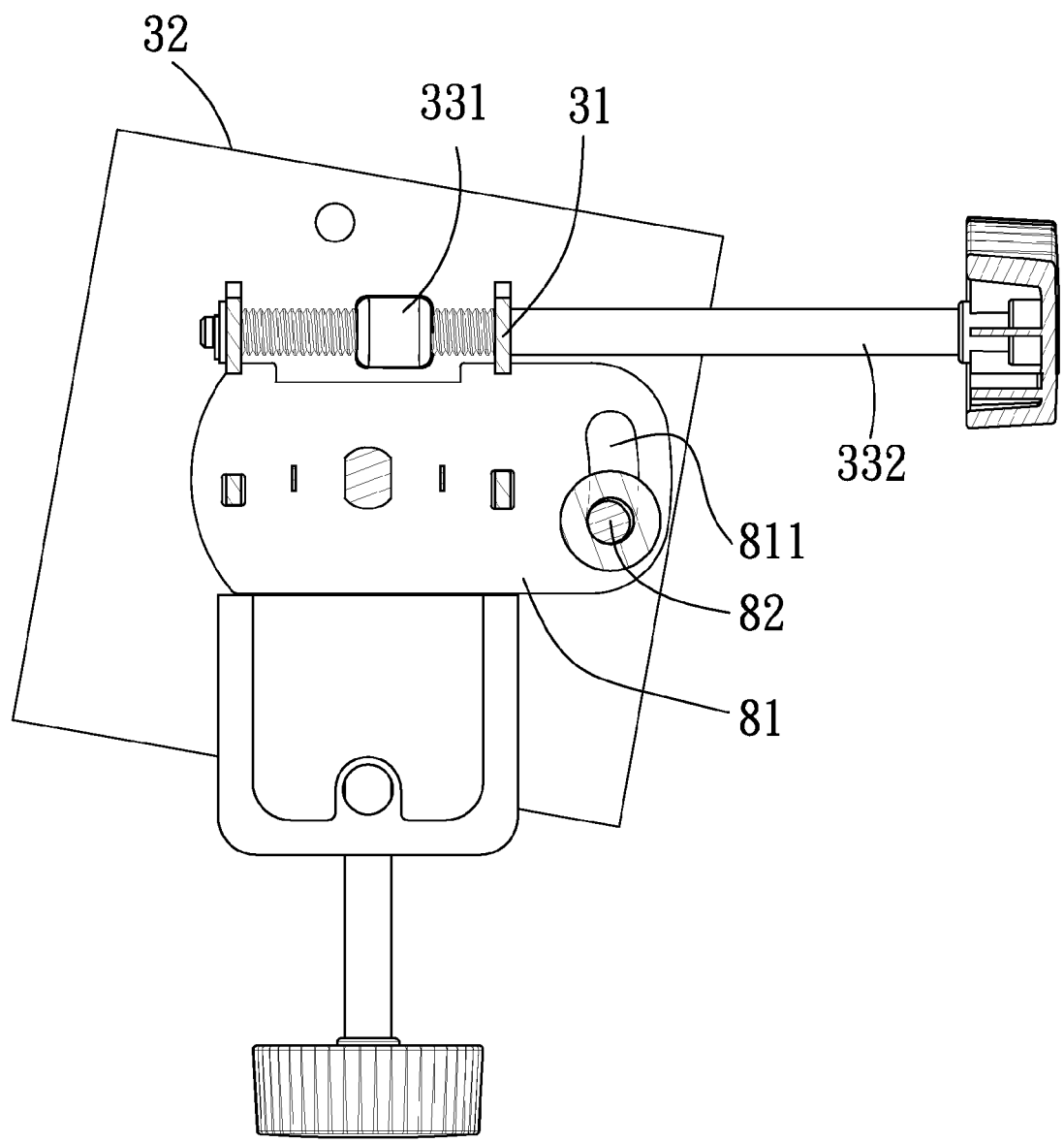
FIG. 14 is a fragmentary schematic top sectional view similar to FIG. 13 illustrating that rotation of the third adjusting rod results in pivoting of a second connection part relative to a first connection part.

Referring to FIGS. 4, 13 and 14, rotation of the third adjusting rod 332 relative to the first connection part 31 results in displacement of the adjusting base 331 along the third adjusting rod 332 owing to threaded engagement. Since the second connection part 32 is retained pivotally on the first connection part 31 so as to be pivotable relative to the first connection part 31 about the third axis (Z), the adjusting base 331 actuates the second connection part 32 to pivot relative to the first connection part 31 about the third axis (Z). As a result, the second connection part 32 brings the second object coupled thereto to pivot relative to the first object. Moreover, in this embodiment, since the second connection part 32 is movable relative to the adjusting base 331 in combination with a bolt along the longitudinal slot 321 (see FIG. 3), the second connection part 32 may pivot relative to the first connection part 31 about the third axis (Z) and move relative to the adjusting base 331 at the same time. That is, relative distance between the first connection part 31 and the adjusting base 331 is slightly variable for smooth pivoting of the second connection part 32 relative to the first connection part 31.

It is noted that since the first axis (X), the second axis (Y) and the third axis (Z) are independent with respect to each other, and pass through the second mounting part 22, the first mounting part 21 and the first connection part 31, respectively, when assembly of the second mounting part 22 and the first connection part 31 pivots as a result of the second adjusting rod 233 being operated, the first axis (X) and the third axis (Z) are displaced as well. Further, when the first connection part 31 pivots as a result of the first adjusting rod 43 being operated, the third axis (Z) is displaced as well.

Referring to FIG. 7, each of the plug components of the first component 41 includes a plug body 411 and a resilient cover 412 that covers the plug body 411. Each of the plug components of the fourth component 232 includes a plug body 413 and a resilient cover 414 that covers the plug body 413. The resilient covers 412 and 414 may be made of plastic or rubber. Each of the resilient covers 412 and 414 may provide better contacting effects for the inner socket wall surfaces of a respective one of the socket components 422 of the second component 42 and the socket components 235 of the third component 231 to abut against the curved surfaces of a corresponding one of the plug components of the first and fourth components 41 and 232, when the socket components 422 and 235 receive rotatably and respectively the plug components of the first and fourth components 41 and 232. In this way, under a condition that the curved surfaces of the plug components are manufactured with greater tolerances, the inner socket wall surfaces of the socket components 422 and 235 may still smoothly abut against the curved surfaces of the plug components, and noise resulting from abutment between the inner socket wall surfaces and the curved surfaces may be reduced. Moreover, the resilient covers 412 and 414 tightly abut against the inner socket wall surfaces of a respective one of the socket components 422 and 235, so as to assist in keeping the angle-adjustable mounting apparatus steady when the first axis (X), the second axis (Y) and the third axis (Z) are not operated to rotate. Therefore, an angle between the first and second objects may be prevented from being changed when the angle-adjustable mounting apparatus is vibrated (such as vibration resulting from operation of mechanical components of the second object).

Referring to FIGS. 5 and 7, the angle-adjustable mounting apparatus further comprises a resilient first buffer 35 disposed between the second mounting part 22 and the second component 42 for preventing the second component 42 from bumping against the second mounting part 22 as the second component 42 rotates, and a resilient second buffer 36 disposed between the second mounting part 22 and the third component 231 for preventing the second mounting part 22 from bumping against the third component 231 as the second mounting part 22 rotates. In this embodiment, the first and second buffers 35 and 36 are rubber pads.

Referring to FIGS. 3, 13 and 14, one of the first and second connection parts 31 or 32 has a limit slot 811 and the other one of the first and second connection parts 32 or 31 has a limit protrusion 82 that cooperates with the limit slot 811 to limit angular rotation of the second connection part 32 relative to the first connection part 31. In this embodiment, the angle-adjustable mounting apparatus further comprises a limit board 81 which is fixed to one side of the first connection part 31 adjacent to the second connection part 32 and which is formed with the curved limit slot 811. The limit protrusion 82 is fixed to the second connection part 32, and is movable relative to the limit board 81 along the limit slot 811. When the second connection part 32 pivots relative to the first connection part 31, the limit protrusion 82 is brought to pivot about the third axis (Z) and to be limited by a curve length of the limit slot 811 such that the angular rotation of the second connection part 32 relative to the first connection part 31 is limited by the curve length of the limit slot 811. In this way, damage resulting from excessive angular rotation of the second connection part 32 relative to the first connection part 31 may be prevented.

Figure 15:
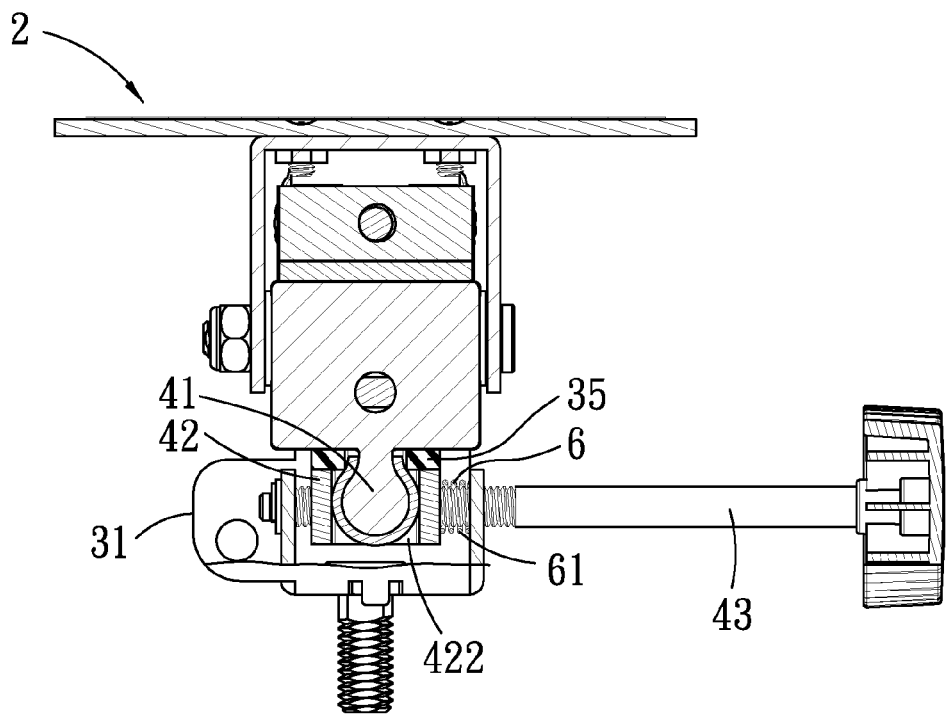
FIG. 15 is a fragmentary schematic sectional view illustrating a second preferred embodiment of the present invention which comprises a spring sleeved on the first adjusting rod.
Figure 16:
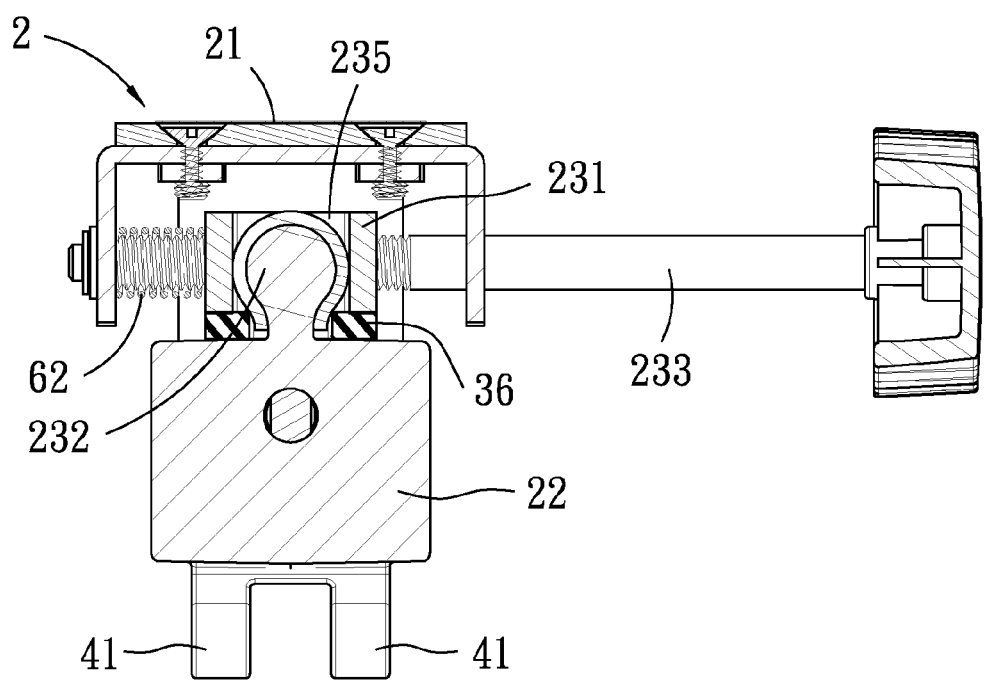
FIG. 16 is a fragmentary schematic rear sectional view illustrating the second preferred embodiment which further comprises a spring sleeved on the second adjusting rod.
Figure 17:
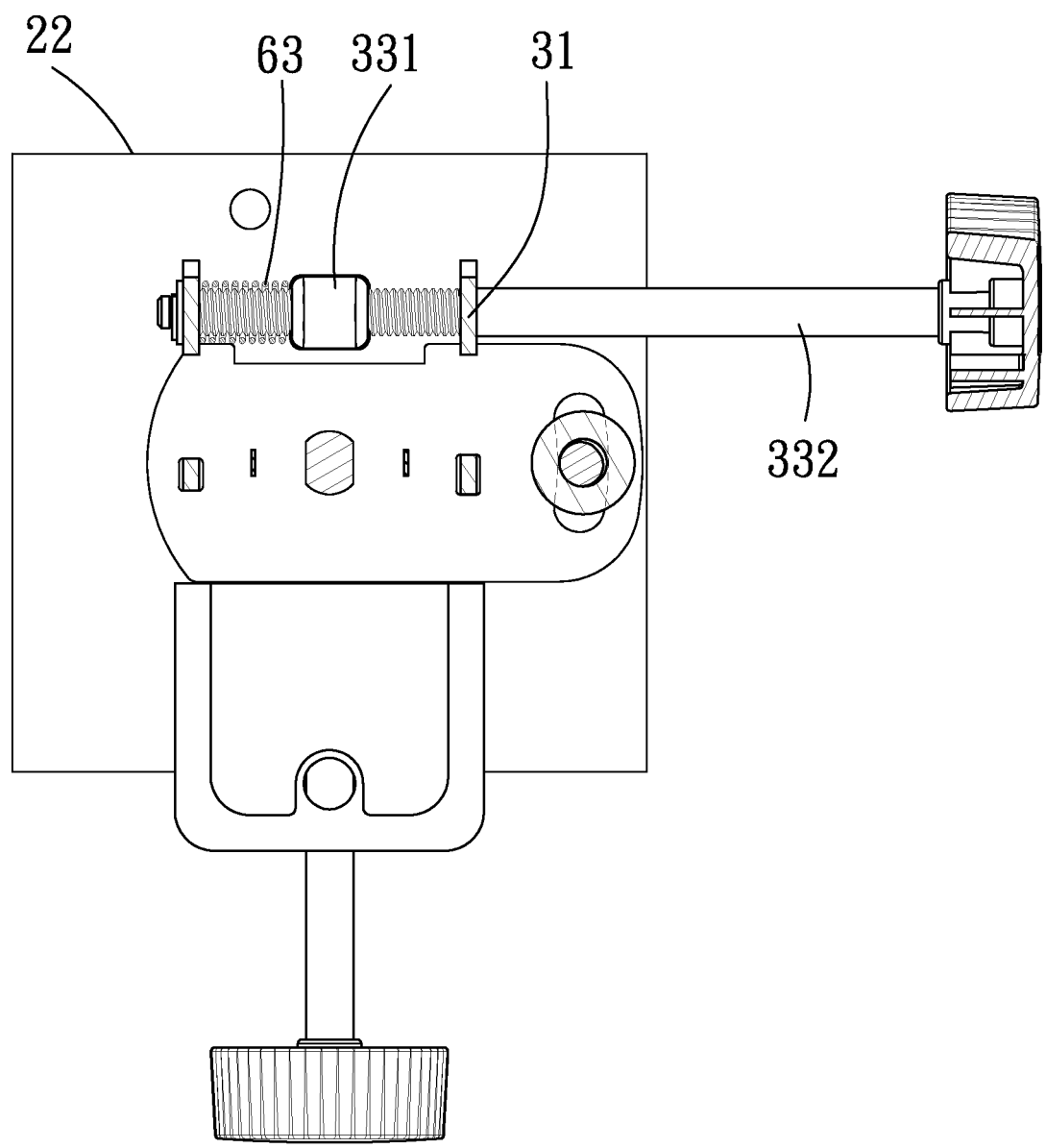
FIG. 17 is a fragmentary schematic top sectional view illustrating the second preferred embodiment which further comprises a spring sleeved on the third adjusting rod.

Referring to FIGS. 15, 16 and 17, a second preferred embodiment of the angle-adjustable mounting apparatus according to the present invention is illustrated. The second preferred embodiment is substantially identical to the first preferred embodiment, but differs in the configuration that the angle-adjustable mounting apparatus further comprises a resilient unit 6 including a first spring 61, a second spring 62 and a third spring 63. The first spring 61 is sleeved on the first adjusting rod 43 and has two opposite ends acting on the second component 42 and the first connection part 31 of the second mounting device 3, respectively. The second spring 62 is sleeved on the second adjusting rod 233 and has two opposite ends acting on the third component 231 and the first mounting part 21, respectively. The third spring 63 is sleeved on the third adjusting rod 332 and has two opposite ends acting on the adjusting base 331 and the first connection part 31. Each of the first spring 61, the second spring 62 and the third spring 63 applies a force to a respective one of the second component 42, the third component 231 and the adjusting base 331 along a corresponding one of the first, second and third adjusting rods 43, 233 and 332, such that internal threads of the second component 42, the third component 231 and the adjusting base 331 engage tightly and respectively threads of the first, second and third adjusting rods 43, 233 and 332. In this way, when the first, second and third adjusting rod 43, 233 and 332 are operated reversely, a user may not feel idle rotation of the angle-adjustable mounting apparatus as a result of the threads not engaging tightly the internal threads.

To sum up, the angle between the second object and the first object may be adjusted with precision and ease by means of arrangements of the components of the angle-adjustable mounting apparatus in a manner that rotation of the first, second and third adjusting rods 43, 233 and 332 results in pivoting of the second mounting device 3, the second mounting part 22 and the second connection part 32 about a respective one of the first, second and third axes (X, Y and Z) which are perpendicular to each other.

While the present invention has been described in connection with what are considered the most practical embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An angle-adjustable mounting apparatus for mounting a second object to a first object, said angle-adjustable mounting apparatus comprising:
    a first mounting device to be coupled to the first object;
    a second mounting device to be coupled to the second object, said second mounting device being connected pivotally to said first mounting device and being pivotable relative to said first mounting device about a first axis; and
    a first pivot-control unit including a first component provided at said first mounting device and a second component provided at said second mounting device, said second component abutting against and being rotatable relative to said first component to enable said second mounting device to pivot relative to said first mounting device about the first axis, one of said first and second components being a plug component with a curved surface, and the other one of said first and second components being a socket component;
    said first pivot-control unit further including a first adjusting rod coupled to said second component and operable to drive said second component so that assembly of said second component and said second mounting device pivots relative to said first component,
    wherein said first mounting device includes:
        a first mounting part to be coupled to the first object;
        a second mounting part connected pivotally to said first mounting part and pivotable relative to said first mounting part about a second axis that is perpendicular to the first axis, said second mounting device being connected pivotally to said second mounting part; and
        a second pivot-control unit including a third component provided at said first mounting part and a fourth component provided at said second mounting part, said fourth component abutting against and being rotatable relative to said third component to enable said second mounting part to pivot relative to said first mounting part about the second axis,
    wherein said second pivot-control unit further includes a second adjusting rod coupled to said third component and operable to drive said third component so that assembly of said fourth component and said second mounting part pivots relative to said third component,
    wherein said second mounting device includes:
        a first connection part connected pivotally to said second mounting part;
        a second connection part to be connected to the second object and retained pivotally on said first connection part so as to be pivotable relative to said first connection part about a third axis perpendicular to the first and second axes; and
        a third pivot-control unit including
            an adjusting base provided on said second connection part and formed with a third threaded hole therethrough, said third threaded hole having a hole axis that is not parallel to the third axis, and
            a third adjusting rod which is a threaded rod coupled rotatably to said first connection part for rotation about a rod axis of said third adjusting rod, said third adjusting rod threadedly engaging said third threaded hole,
    wherein rotation of said third adjusting rod relative to said first connection part results in displacement of said adjusting base along said third adjusting rod and pivoting of said second connection part relative to said first connection part.

2. The angle-adjustable mounting apparatus as claimed in claim 1, wherein said second component is formed with a first threaded hole therethrough, said first threaded hole having a hole axis that is not parallel to the first axis, said first adjusting rod being a threaded rod which is coupled rotatably to said second mounting device for rotation about a rod axis of said first adjusting rod and which threadedly engages said first threaded hole, and
    wherein rotation of said first adjusting rod relative to said second mounting device results in displacement of said first adjusting rod along said first threaded hole and pivoting of the assembly of said second component and said second mounting device relative to said first component.

3. The angle-adjustable mounting apparatus as claimed in claim 2, wherein said socket component receives rotatably said plug component and has an inner socket wall surface that abuts against said curved surface of said plug component.

4. The angle-adjustable mounting apparatus as claimed in claim 1, wherein said third component is formed with a second threaded hole therethrough, said second threaded hole having a hole axis that is not parallel to the second axis, said second adjusting rod being a threaded rod which is coupled rotatably to said first mounting part for rotation about a rod axis of said second adjusting rod and which threadedly engages said second threaded hole, and wherein rotation of said second adjusting rod relative to said first mounting part results in displacement of said third component along said second adjusting rod and pivoting of the assembly of said fourth component and said second mounting part relative to said third component.

5. The angle-adjustable mounting apparatus as claimed in claim 4, wherein one of said third and fourth components is a plug component with a curved surface, and the other one of said third and fourth components is a socket component that receives rotatably said plug component and that has an inner socket wall surface that abuts against said curved surface.

6. The angle-adjustable mounting apparatus as claimed in claim 1, wherein said second connection part is movable relative to said adjusting base on a plane perpendicular to the third axis.

7. The angle-adjustable mounting apparatus as claimed in claim 3, wherein said plug component includes a plug body and a resilient cover that covers said plug body.

8. The angle-adjustable mounting apparatus as claimed in claim 5, wherein said plug component includes a plug body and a resilient cover that covers said plug body.

9. The angle-adjustable mounting apparatus as claimed in claim 1, further comprising a spring which is sleeved on said first adjusting rod and which has two opposite ends acting on said second component and said second mounting device, respectively.

10. The angle-adjustable mounting apparatus as claimed in claim 1, further comprising a spring which is sleeved on said second adjusting rod and which has two opposite ends acting on said third component and said first mounting part, respectively.

11. The angle-adjustable mounting apparatus as claimed in claim 1, further comprising a spring which is sleeved on said third adjusting rod and which has two opposite ends acting on said adjusting base and said first connection part.

12. The angle-adjustable mounting apparatus as claimed in claim 1, further comprising a resilient unit including:
   a first spring which is sleeved on said first adjusting rod and which has two opposite ends acting on said second component and said second mounting device, respectively;
   a second spring which is sleeved on said second adjusting rod and which has two opposite ends acting on said third component and said first mounting part, respectively; and
   a third spring which is sleeved on said third adjusting rod and which has two opposite ends acting on said adjusting base and said first connection part.

13. The angle-adjustable mounting apparatus as claimed in claim 1, further comprising a resilient first buffer disposed between said second mounting part and said second component, and a resilient second buffer disposed between said second mounting part and said third component.

14. The angle-adjustable mounting apparatus as claimed in claim 1, wherein said first adjusting rod has a first large-diameter section, a first small-diameter section which is located at a distal end of said first large-diameter section and which has a diameter smaller than that of said first large-diameter section, and a first annular slot formed in said first small-diameter section, said first small-diameter section of said first adjusting rod extending through said first connection part, said angle-adjustable mounting apparatus further comprising a first engaging ring for engaging said first annular slot in a manner that a section of said first connection part is sandwiched between said first large-diameter section and said first engaging ring.

15. The angle-adjustable mounting apparatus as claimed in claim 14, wherein said second adjusting rod has a second large-diameter section, a second small-diameter section which is located at a distal end of said second large-diameter section and which has a diameter smaller than that of said second large-diameter section, and a second annular slot formed in said second small-diameter section, said second small-diameter section of said second adjusting rod extending through said first mounting part, said angle-adjustable mounting apparatus further comprising a second engaging ring for engaging said second annular slot in a manner that a section of said first mounting part is sandwiched between said second large-diameter section and said second engaging ring.

16. The angle-adjustable mounting apparatus as claimed in claim 15, wherein said third adjusting rod has a third large-diameter section, a third small-diameter section which is located at a distal end of said third large-diameter section and which has a diameter smaller than that of said third large-diameter section, and a third annular slot formed in said third small-diameter section, said third small-diameter section of said third adjusting rod extending through said first connection part, said angle-adjustable mounting apparatus further comprising a third engaging ring for engaging said third annular slot in a manner that a section of said first connection part is sandwiched between said third large-diameter section and said third engaging ring.

17. The angle-adjustable mounting apparatus as claimed in claim 1, wherein one of said first and second connection parts has a limit slot and the other one of said first and second connection parts has a limit protrusion that cooperates with said limit slot to limit angular rotation of said second connection part relative to said first connection part.

18. The angle-adjustable mounting apparatus as claimed in claim 3, wherein said inner socket wall surface of said socket component abuts against diametrically opposite parts of said curved surface of said plug component.

19. The angle-adjustable mounting apparatus as claimed in claim 5, wherein said inner socket wall surface of said socket component abuts against diametrically opposite parts of said curved surface of said plug component.

* * * * *